US012749759B2

(12) United States Patent
Kim et al.

(10) Patent No.: US 12,749,759 B2
(45) Date of Patent: Sep. 29, 2026

(54) BATTERY MODULE, BATTERY PACK INCLUDING BATTERY MODULE, AND VEHICLE INCLUDING BATTERY PACK

(71) Applicant: LG ENERGY SOLUTION, LTD., Seoul (KR)

(72) Inventors: Se-Ho Kim, Daejeon (KR); Sang-Yoon Jeong, Daejeon (KR); Jung-Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 620 days.

(21) Appl. No.: 18/011,470

(22) PCT Filed: Nov. 15, 2021

(86) PCT No.: PCT/KR2021/016675
§ 371 (c)(1),
(2) Date: Dec. 19, 2022

(87) PCT Pub. No.: WO2022/108279
PCT Pub. Date: May 27, 2022

(65) Prior Publication Data
US 2023/0282923 A1 Sep. 7, 2023

(30) Foreign Application Priority Data
Nov. 23, 2020 (KR) ........................ 10-2020-0158075

(51) Int. Cl.
*H01M 50/291* (2021.01)
*H01M 10/04* (2006.01)
(Continued)

(52) U.S. Cl.
CPC ..... *H01M 50/291* (2021.01); *H01M 10/0481* (2013.01); *H01M 50/204* (2021.01); *H01M 50/249* (2021.01); *H01M 2220/20* (2013.01)

(58) Field of Classification Search
CPC . H01M 50/204; H01M 50/289; H01M 50/291
See application file for complete search history.

(56) References Cited

U.S. PATENT DOCUMENTS 11,050,107 B2 6/2021 Fukuoka et al.
11,121,395 B2 9/2021 Kim et al.
(Continued)

FOREIGN PATENT DOCUMENTS

CN 108352470 A 7/2018
CN 110168771 A 8/2019
(Continued)

OTHER PUBLICATIONS

Machine Translation of KR20170135476A (Year: 2017).*
(Continued)

*Primary Examiner* — Jonathan G Jelsma
(74) *Attorney, Agent, or Firm* — Birch, Stewart, Kolasch & Birch, LLP

(57) ABSTRACT

A battery module includes a battery cell assembly including a plurality of battery cells stacked on each other, a base plate configured to support a lower side of the battery cell assembly, a cover plate spaced apart from the base plate and configured to cover an upper side of the battery cell assembly, and an elastic bead unit disposed between the cover plate and the battery cell assembly.

10 Claims, 5 Drawing Sheets

(51) Int. Cl.
*H01M 50/204* (2021.01)
*H01M 50/249* (2021.01)

(56) References Cited

U.S. PATENT DOCUMENTS

| | | | | |
|---|---|---|---|---|
| 2008/0070068 | A1 | 3/2008 | Fritz et al. | |
| 2017/0098868 | A1* | 4/2017 | Kotik | B32B 15/18 |
| 2017/0279088 | A1* | 9/2017 | Reinshagen | H01M 50/264 |
| 2018/0062127 | A1 | 3/2018 | Lee et al. | |
| 2018/0097211 | A1 | 4/2018 | Chol et al. | |
| 2018/0151855 | A1 | 5/2018 | Iwasaki et al. | |
| 2018/0287111 | A1 | 10/2018 | Fukuoka et al. | |
| 2018/0337376 | A1 | 11/2018 | Jin et al. | |
| 2019/0245171 | A1 | 8/2019 | Jin et al. | |
| 2019/0363392 | A1 | 11/2019 | Kim et al. | |
| 2020/0152931 | A1* | 5/2020 | Kim | H01M 10/0413 |
| 2020/0194753 | A1 | 6/2020 | Fujiwara et al. | |
| 2021/0344057 | A1 | 11/2021 | Seo et al. | |
| 2022/0037714 | A1 | 2/2022 | Lee | |

FOREIGN PATENT DOCUMENTS

| | | | | |
|---|---|---|---|---|
| EP | 3125332 | A1 * | 2/2017 | B60L 50/50 |
| JP | 2007-115604 | A | 5/2007 | |
| JP | 2007-165698 | A | 6/2007 | |
| JP | 2009-146795 | A | 7/2009 | |
| JP | 2017-196959 | A | 11/2017 | |
| JP | 2018-129240 | A | 8/2018 | |
| JP | 2020-4556 | A | 1/2020 | |
| KR | 10-2013-0123762 | A | 11/2013 | |
| KR | 10-2017-0013005 | A | 2/2017 | |
| KR | 20170135476 | A * | 12/2017 | H01M 10/6569 |
| KR | 10-2019-0031831 | A | 3/2019 | |
| KR | 10-2018301 | B1 | 9/2019 | |
| KR | 10-2020-0022793 | A | 3/2020 | |
| KR | 10-2020-0086172 | A | 7/2020 | |
| KR | 10-2020-0106378 | A | 9/2020 | |
| KR | 10-2171344 | B1 | 10/2020 | |
| WO | WO 2017/026145 | A1 | 2/2017 | |
| WO | WO 2017/068705 | A1 | 4/2017 | |
| WO | WO 2019/003772 | A1 | 1/2019 | |

OTHER PUBLICATIONS

International Search Report for PCT/KR2021/016675 (PCT/ISA/210) mailed on Feb. 25, 2022.

Extended European Search Report for European Application No. 21895047.5, dated Feb. 27, 2024.

* cited by examiner

BATTERY MODULE, BATTERY PACK INCLUDING BATTERY MODULE, AND VEHICLE INCLUDING BATTERY PACK

TECHNICAL FIELD

The present disclosure relates to a battery module, a battery pack including the battery module, and a vehicle including the battery pack.

The present application claims priority to Korean Patent Application No. 10-2020-0158075 filed on Nov. 23, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

In the case of a conventional battery module, it is important to apply a pressing force within a certain range to the battery cell in order to improve performance such as the lifespan of the battery cell. In addition, it is important to control the expansion of the battery cell, namely cell swelling.

Accordingly, it is demanded to find a way to provide a battery module, which may improve the performance of the battery cell and effectively control cell swelling, a battery pack including the battery module, and a vehicle including the battery pack.

DISCLOSURE

Technical Problem

The present disclosure is directed to providing a battery module, which may improve the performance of a battery cell and effectively control cell swelling, a battery pack including the battery module, and a vehicle including the battery pack.

Technical Solution

In one aspect of the present disclosure, there is provided a battery module, comprising: a battery cell assembly including a plurality of battery cells stacked on each other; a base plate configured to support a lower side of the battery cell assembly; a cover plate spaced apart from the base plate and configured to cover an upper side of the battery cell assembly; and an elastic bead unit disposed between the cover plate and the battery cell assembly.

The battery module may further comprise at least one compression pad disposed between one battery cell and an adjacent battery cell of the plurality of battery cells.

The elastic bead unit may include a contact plate disposed in contact with the battery cell assembly; and an elastic deformation unit disposed between the contact plate and the cover plate.

The elastic deformation unit may include a first elastic member disposed at least partially in contact with the contact plate; and a second elastic member disposed at least partially in contact with the first elastic member and disposed at least partially in contact with the cover plate.

Each of the first elastic member and the second elastic member may be provided with a concave-convex shape such that convex portions and concave portions are alternately arranged.

Each of the convex portions of the first elastic member may be disposed in contact with a corresponding convex portion of the convex portions of the second elastic member.

Each of the concave portions of the first elastic member may be disposed opposite a corresponding concave portion of the concave portions of the second elastic member.

The elastic deformation unit may include a first elastic member. The first elastic member may be disposed at least partially in contact with the contact plate and at least partially in contact with the cover plate.

The first elastic member may be provided with a concave-convex shape such that convex portions and concave portions are alternately arranged.

The at least one compression pad may be disposed at a center of the plurality of battery cells in a height direction of the plurality of battery cells.

The at least one compression pad may be a pair of compression pads.

The battery module may further comprise a pair of side beams arranged at opposite sides of the battery cell assembly. The pair of side beams may be connected to the base plate and the cover plate.

Each side beam of the pair of side beams may include a bolt and a nut.

In addition, the present disclosure further provides a battery pack, comprising: at least one battery module according to the above embodiments; and a pack case configured to package the at least one battery module.

Moreover, the present disclosure further provides a vehicle, comprising at least one battery pack according to the above embodiments.

Advantageous Effects

According to various embodiments as described above, it is possible to provide a battery module, which may improve the performance of a battery cell and effectively control cell swelling, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
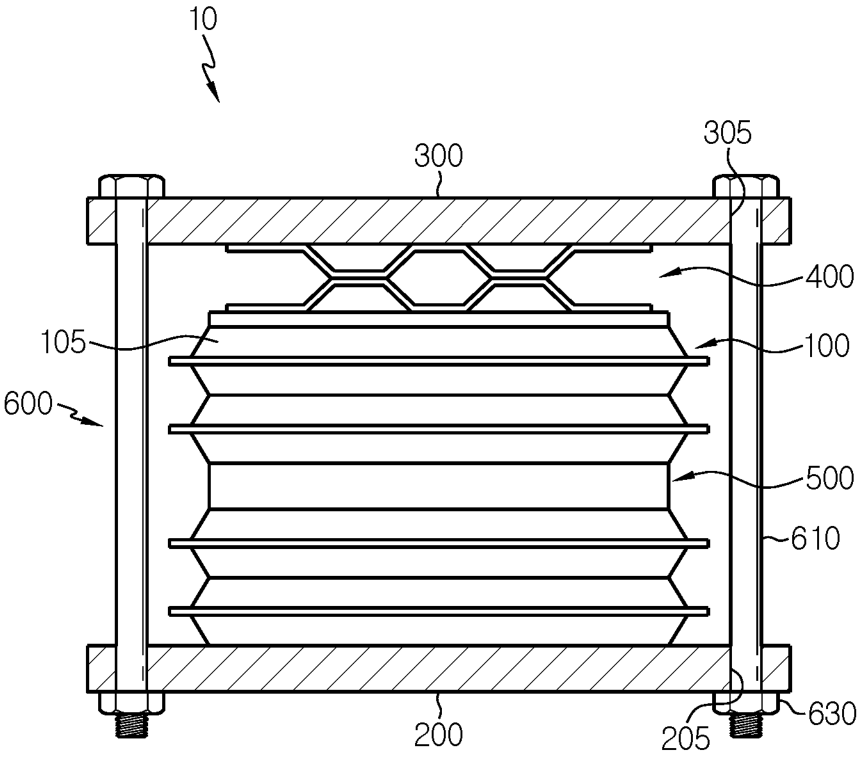
FIG. 1 is a diagram for illustrating a battery module according to an embodiment of the present disclosure.

FIG. 1 is a diagram for illustrating a battery module according to an embodiment of the present disclosure.

Referring to FIG. 1, the battery module 10 may include a battery cell assembly 100, a base plate 200, a cover plate 300, and an elastic bead unit 400.

The battery cell assembly 100 may include a plurality of battery cells 105 stacked on each other.

The plurality of battery cells 105 are secondary batteries, and may be provided as a pouch-type secondary battery, a prismatic secondary battery, or a cylindrical secondary battery. Hereinafter, in this embodiment, the plurality of battery cells 105 will be described as pouch-type secondary batteries.

The base plate 200 may support a lower side of the battery cell assembly 100. Accordingly, the base plate 200 may have a shape and size capable of supporting the lower side of the battery cell assembly 100.

The base plate 200 may include a beam fastening unit 205 for fastening with a side beam 600, explained later.

The cover plate 300 is spaced apart from the base plate 200, and may cover an upper side of the battery cell assembly 100. Accordingly, the cover plate 300 may have a shape and size capable of supporting the upper side of the battery cell assembly 100.

The cover plate 300 may include a beam fastening unit 305 for fastening with a side beam 600, explained later.

The elastic bead unit 400 is for controlling cell swelling of the battery cells 105 of the battery cell assembly 100, and may be disposed between the cover plate 300 and the battery cell assembly 100. Specifically, the elastic bead unit 400 may be disposed between the cover plate 300 and the battery cell 105 at the uppermost end of the battery cell assembly 100.

Hereinafter, the elastic bead unit 400 will be described in more detail.

Figure 2:
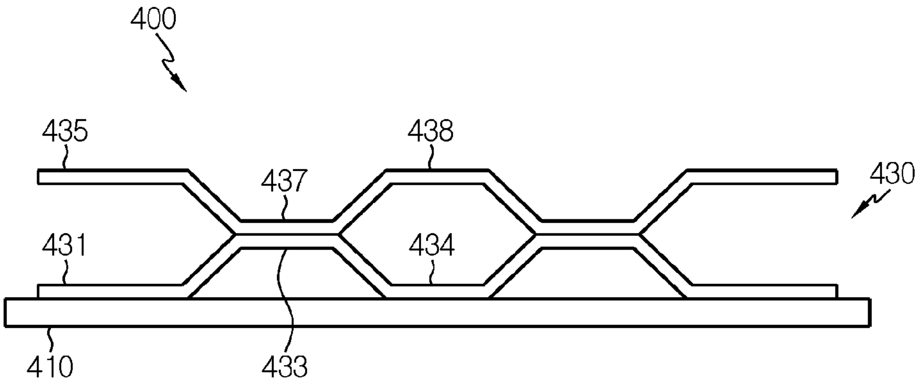
FIG. 2 is a diagram for illustrating an elastic bead unit of the battery module of FIG. 1.

FIG. 2 is a diagram for illustrating an elastic bead unit of the battery module of FIG. 1.

Referring to FIG. 2, the elastic bead unit 400 may include a contact plate 410 and an elastic deformation unit 430.

The contact plate 410 has a substantially flat plate shape, and may be disposed in contact with the battery cell assembly 100. Specifically, the contact plate 410 may be disposed in contact with the battery cell 105 at the uppermost end of the battery cell assembly 100.

The elastic deformation unit 430 may be disposed between the contact plate 410 and the cover plate 300.

The elastic deformation unit 430 may include a first elastic member 431 and a second elastic member 435.

The first elastic member 431 may be disposed at least partially in contact with the contact plate 410. The first elastic member 431 is provided in a concave-convex shape, and convex portions 433 and concave portions 434 may be arranged alternately. The convex portion 433 of the first elastic member 431 may be disposed in elastic contact with the convex portion 437 of the second elastic member 435, explained later.

The second elastic member 435 may be disposed at least partially in contact with the first elastic member 431 and disposed at least partially in contact with the cover plate 300.

The second elastic member 435 is provided in a concave-convex shape, and convex portions 437 and concave portions 438 may be arranged alternately. The convex portion 437 of the second elastic member 435 may be arranged in elastic contact with the convex portion 433 of the first elastic member 431.

Figure 3:
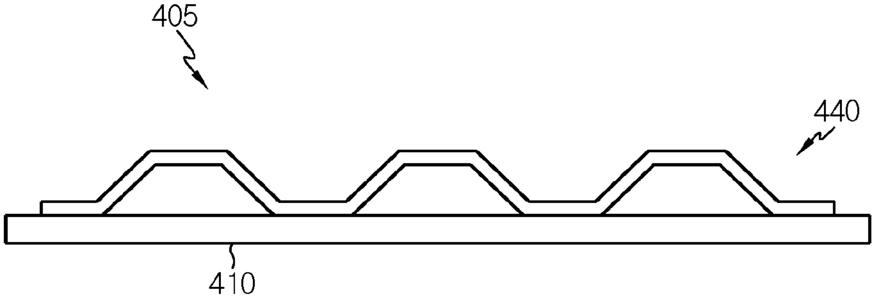
FIG. 3 is a diagram for illustrating an elastic bead unit according to another embodiment of the battery module of FIG. 1.

FIG. 3 is a diagram for illustrating an elastic bead unit according to another embodiment of the battery module of FIG. 1.

Referring to FIG. 3, the elastic bead unit 405 may include a contact plate 410 and an elastic deformation unit 440.

The contact plate 410 is substantially identical or similar to the former embodiment, and thus will not be described in detail.

The elastic deformation unit 440 may be provided as a single member, unlike the former embodiment. The elastic deformation unit 440 may be disposed at least partially in contact with the cover plate 300 of the former embodiment. The elastic deformation unit 440 is provided in a concave-convex shape, and convex portions and concave portions may be alternately arranged.

As described above, the elastic deformation unit 440 may be provided as a plurality of elastic members 431, 435 as in the elastic deformation unit 430 of the former embodiment, or may be provided as a single member as in this embodiment.

Referring to FIG. 1 again, the battery module 10 may include a compression pad 500 and a side beam 600.

The compression pad 500 is made of an elastic material having a predetermined elasticity, and may be disposed between the plurality of battery cells 105 of the battery cell assembly 100.

The compression pad 500 may be disposed at the center of the plurality of battery cells 105 in a height direction of the plurality of battery cells 105. The compression pad 500 may provide a predetermined pressing force toward the battery cells 105 between the base plate 200 and the cover plate 300 to improve the lifespan or the like of the battery cell assembly 100.

The side beam 600 may be provided as a pair.

The pair of side beams 600 cover both sides of the battery cell assembly 100, and may be connected to the base plate 200 and the cover plate 300.

The pair of side beams 600 may include a beam bolt 610 and a beam nut 630, respectively.

The beam bolt 610 is formed in a predetermined length, and may be fastened through the beam fastening unit 205 of the base plate 200 and the beam fastening unit 305 of the cover plate 300.

The beam nut 630 is fastened with the beam bolt 610 to stably fix the beam bolt 610 between the base plate 200 and the cover plate 300.

Hereinafter, the cell swelling control mechanism of the battery module 10 according to this embodiment will be explained in more detail.

Figure 4:
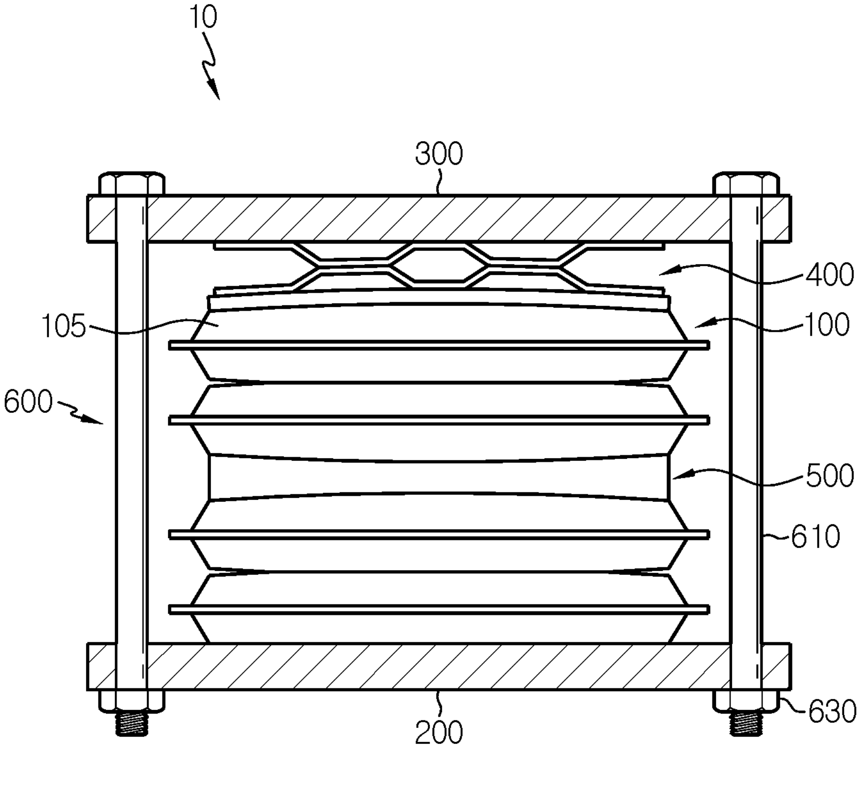
FIG. 4 is a diagram for illustrating a cell swelling control mechanism of the battery module of FIG. 1.

FIG. 4 is a diagram for illustrating a cell swelling control mechanism of the battery module of FIG. 1.

Referring to FIG. 4, cell swelling may occur due to expansion or the like of the battery cells 105 of the battery cell assembly 100 of the battery module 10. At this time, if the base plate 200 or the cover plate 300 is broken or fractured due to the cell swelling, a greater risk may be caused.

In this embodiment, when the cell swelling occurs, the cell swelling may be buffered through the elastic bead unit 400 in the expansion direction of the battery cells 105. Accordingly, in this embodiment, when the cell swelling occurs, the pressure applied toward the base plate 200 and the cover plate 300 may be minimized by means of the elastic bead unit 400.

In other words, in this embodiment, when the cell swelling occurs, the pressing force of the battery cells 105 is absorbed by means of the elastic bead unit 400, so that the risk that the base plate 200 and the cover plate 300 are broken or ruptured may be minimized.

After all, in this embodiment, by means of the elastic bead unit 400, it is possible to control the cell swelling that corresponds to irreversible deformation of the battery cells 105. In addition, in this embodiment, the reversible deformation of the battery cells 105 may be controlled through the compression force and repulsion force of the compression pad 500.

Accordingly, in this embodiment, by means of the elastic bead unit 400 and the compression pad 500, it is possible to more efficiently control the battery cells 105 in both the reversible deformation and the irreversible deformation of the battery cells 105.

Therefore, in this embodiment, by means of the elastic bead unit 400 and the compression pad 500, the performance of the battery cells 105 may be improved, and the risk that the base plate 200 and the cover plate 300 are broken when the cell swelling occurs in the battery cells 105 may be significantly lowered.

Figure 5:
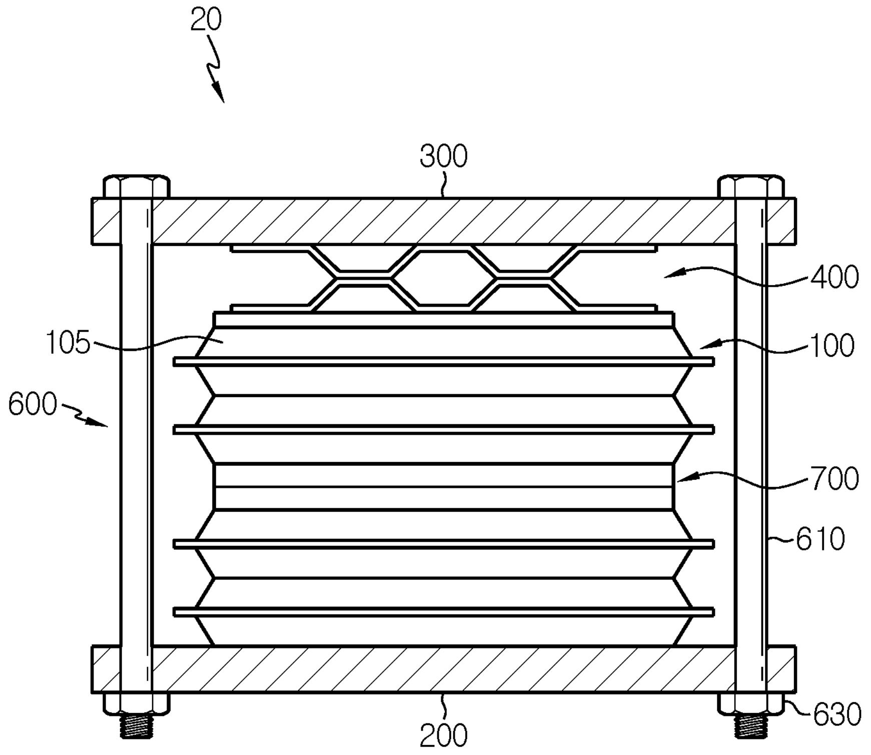
FIG. 5 is a diagram for illustrating a battery module according to another embodiment of the present disclosure.

FIG. 5 is a diagram for illustrating a battery module according to another embodiment of the present disclosure.

The battery module 20 according to this embodiment is similar to the battery module 10 of the former embodiment. Thus, features substantially identical or similar to the former embodiment will not be described again, and hereinafter, features different from the former embodiment will be described in detail.

Referring to FIG. 5, the battery module 20 may include a battery cell assembly 100, a base plate 200, a cover plate 300, an elastic bead unit 400, a side beam 600, and a pair of compression pads 700.

The battery cell assembly 100 may include a plurality of battery cells 105.

The plurality of battery cells 105 are substantially identical or similar to the former embodiment and thus, hereinafter, will not be described again.

The base plate 200, the cover plate 300 and the elastic bead unit 400 are substantially identical or similar to those of the former embodiment, and thus will not be described in detail again.

The side beam 600 may include a beam bolt 610 and a beam nut 630.

The beam bolt 610 and the beam nut 630 are substantially identical or similar to those of the former embodiment, and thus will not be described in detail again.

The pair of compression pads 700 may be provided to be stacked on each other in the height direction of the battery cells 105.

In the case of this embodiment, the compression pad 700 is provided in plural, the compression force and the repulsion force of the compression pad 700 may be further increased.

Figure 6:
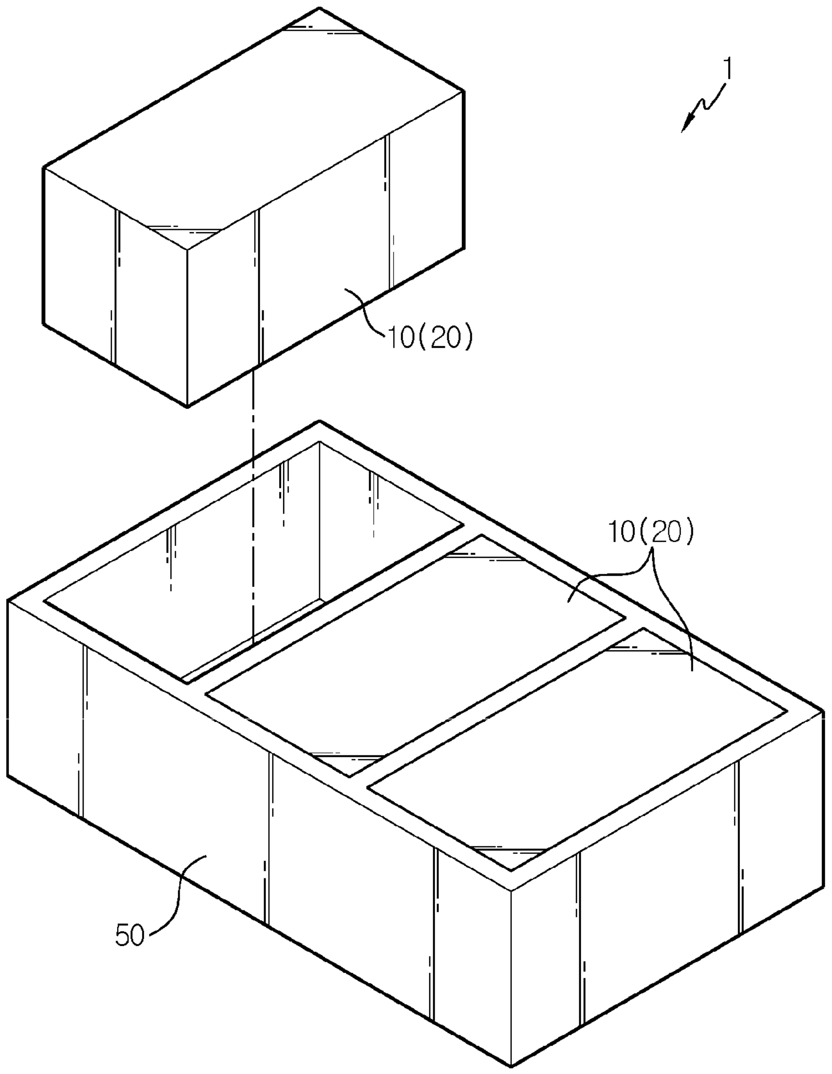
FIG. 6 is a diagram for illustrating a battery pack according to an embodiment of the present disclosure.
Figure 7:
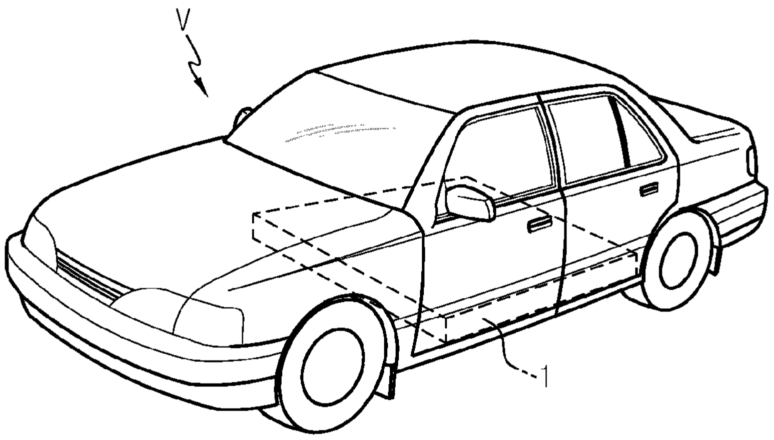
FIG. 7 is a diagram for illustrating a vehicle according to an embodiment of the present disclosure.

FIG. 6 is a diagram for illustrating a battery pack according to an embodiment of the present disclosure, and FIG. 7 is a diagram for illustrating a vehicle according to an embodiment of the present disclosure.

Referring to FIGS. 6 and 7, a battery pack 1 may include at least one battery module 10, 20 and a pack case 50 for packaging the at least one battery module 10, 20 according to the former embodiment.

The battery pack 1 may be provided to a vehicle V as a fuel source of the vehicle. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle, which have the battery pack 1, include the battery module 10, 20 as described above, and thus it is possible to implement a battery pack 1 having all the advantages of the battery module 10, 20 described above, or devices, instruments, facilities or the like such as the vehicle V, which have the battery pack 1.

According to various embodiments as described above, it is possible to provide the battery module 10, 20, which may improve the performance of the battery cell 105 and effectively control cell swelling, the battery pack 1 including the battery module 10, 20, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:

a battery cell assembly including a plurality of battery cells stacked on each other;

a base plate configured to support a lower side of the battery cell assembly;

a cover plate spaced apart from the base plate and configured to cover an upper side of the battery cell assembly; and an elastic bead unit disposed between the cover plate and the battery cell assembly, wherein the battery cell assembly includes exactly one compression pad, the exactly one compression pad being disposed between one battery cell and an adjacent battery cell of the plurality of battery cells, the exactly one compression pad being a unitary member directly contacting the one battery cell and the adjacent battery cell, wherein the elastic bead unit includes:

a contact plate disposed in contact with the battery cell assembly; and an elastic deformation unit disposed between the contact plate and the cover plate, wherein the elastic deformation unit includes:

a first elastic member disposed at least partially in contact with the contact plate; and a second elastic member disposed at least partially in contact with the first elastic member and disposed at least partially in contact with the cover plate, and wherein each of the first elastic member and the second elastic member is provided with a concave-convex shape such that convex portions and concave portions are alternately arranged and opposing ends of the first elastic member and the second elastic member are spaced apart such that one of the opposing ends contacts the contact plate and another of the opposing ends contacts the cover plate.

2. The battery module according to claim 1, wherein each of the convex portions of the first elastic member is disposed in contact with a corresponding convex portion of the convex portions of the second elastic member.

3. The battery module according to claim 1, wherein the exactly one compression pad is disposed at a center of the plurality of battery cells in a height direction of the plurality of battery cells.

4. The battery module according to claim 1, further comprising:

a pair of side beams arranged at opposite sides of the battery cell assembly, the pair of side beams being connected to the base plate and the cover plate.

5. The battery module according to claim 4, wherein each side beam of the pair of side beams includes a bolt and a nut.

6. The battery module according to claim 1, wherein each of the concave portions of the first elastic member is disposed opposite a corresponding concave portion of the concave portions of the second elastic member.

7. A battery pack, comprising:

at least one battery module according to claim 1; and a pack case configured to package the at least one battery module.

8. A vehicle, comprising:

at least one battery pack according to claim 7.

9. A battery module, comprising:

a battery cell assembly including a plurality of battery cells stacked on each other;

a base plate configured to support a lower side of the battery cell assembly;

a cover plate spaced apart from the base plate and configured to cover an upper side of the battery cell assembly; and an elastic bead unit disposed between the cover plate and the battery cell assembly, wherein the battery cell assembly includes exactly one pair of compression pads, the exactly one pair of compression pads disposed between one battery cell and an adjacent battery cell of the plurality of battery cells, each of the compression pads being a unitary body, one of the compression pads being in direct contact with the one battery cell, and another one of the compression pads being in direct contact with the adjacent battery cell, and the exactly one pair of compression pads directly contacting each other.

10. A battery module, comprising:

a battery cell assembly including a plurality of battery cells stacked on each other;

at least one compression pad disposed between one battery cell and an adjacent battery cell of the plurality of battery cells, the at least one compression pad being a unitary member directly contacting the one battery cell and the adjacent battery cell;

a base plate configured to support a lower side of the battery cell assembly;

a cover plate spaced apart from the base plate and configured to cover an upper side of the battery cell assembly; and an elastic bead unit disposed between the cover plate and the battery cell assembly, the elastic bead unit including:

a contact plate disposed in contact with the battery cell assembly;

an elastic deformation unit disposed between the contact plate and the cover plate;

a first elastic member disposed at least partially in contact with the contact plate; and a second elastic member disposed at least partially in contact with the first elastic member and disposed at least partially in contact with the cover plate, wherein each of the first elastic member and the second elastic member is provided with a concave-convex shape such that convex portions and concave portions are alternately arranged and opposing ends of the first elastic member and the second elastic member are spaced apart such that one of the opposing ends contacts the contact plate and another of the opposing ends contacts the cover plate.

* * * * *